United States Patent
Tagashira (10) Patent No.: US 9,053,301 B2
(45) Date of Patent: Jun. 9, 2015

(54) METHOD FOR LOGGING IN TO COMPUTER, INFORMATION PROCESSING APPARATUS AND COMPUTER-READABLE INFORMATION RECORDING MEDIUM

(75) Inventor: Kenji Tagashira, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 718 days.

(21) Appl. No.: 12/457,988

(22) Filed: Jun. 26, 2009

(65) Prior Publication Data

US 2009/0276831 A1 Nov. 5, 2009

Related U.S. Application Data

(63) Continuation of application No. PCT/JP2006/326190, filed on Dec. 28, 2006.

(51) Int. Cl.
G06F 21/00 (2013.01)
G06F 21/30 (2013.01)

(52) U.S. Cl.
CPC ..................... *G06F 21/30* (2013.01)

(58) Field of Classification Search
USPC ....................................... 726/1–36
See application file for complete search history.

(56) References Cited

U.S. PATENT DOCUMENTS

| | | | |
|---|---|---|---|
| 5,793,952 A * | 8/1998 | Limsico | 726/18 |
| 5,836,010 A * | 11/1998 | Kim | 726/20 |
| 6,826,700 B1 * | 11/2004 | Germscheid et al. | 726/5 |
| 7,036,738 B1 * | 5/2006 | Vanzini et al. | 235/486 |
| 8,125,986 B2 * | 2/2012 | Narayanaswami et al. | 370/360 |
| 2003/0023476 A1 * | 1/2003 | Gainey | 705/10 |
| 2004/0010724 A1 * | 1/2004 | Brown et al. | 713/202 |
| 2005/0149738 A1 * | 7/2005 | Targosky | 713/182 |
| 2005/0188425 A1 * | 8/2005 | Horn | 726/34 |
| 2005/0193182 A1 * | 9/2005 | Anderson et al. | 711/163 |
| 2005/0262334 A1 * | 11/2005 | Scudder | 713/1 |
| 2006/0071066 A1 * | 4/2006 | Vanzini et al. | 235/380 |
| 2006/0102716 A1 * | 5/2006 | Vanzini et al. | 235/382 |
| 2006/0212452 A1 * | 9/2006 | Cornacchia, III | 707/10 |

(Continued)

FOREIGN PATENT DOCUMENTS

| | | |
|---|---|---|
| JP | 2002-041469 | 2/2002 |
| JP | 2002-341957 | 11/2002 |
| JP | 2003-088675 | 3/2003 |

(Continued)

OTHER PUBLICATIONS

Le et al, "Method for the Secure Entry of Cryptovariables Into a Cryptographic Facility based on a Software Programming Interface and an Enabling Physical Key-Activated Switch", Mar. 1993, IBM Technical Disclosure Bulletin, vol. 36, No. 03, p. 213-216.*

(Continued)

*Primary Examiner* — Christopher Revak
(74) *Attorney, Agent, or Firm* — Fujitsu Patent Center (57) ABSTRACT

In a method for logging in to a computer, a log-in display is carried out on a terminal unit when the terminal unit is connected to a system management apparatus. A display is carried out to urge an operator to carry out a physical operation when a log-in starting operation is carried out to the terminal unit in response to the log-in display. An operation detection signal is sent when detecting the physical operation carried out to an operating panel. The computer enters a logged-in state when the operation detection signal is detected.

7 Claims, 11 Drawing Sheets

(56) References Cited

U.S. PATENT DOCUMENTS

2007/0130473 A1* 6/2007 Mazotas ............... 713/183
2008/0034411 A1* 2/2008 Aoyama ............... 726/5

FOREIGN PATENT DOCUMENTS

| JP | 2006-059161 A | 3/2006 |
| JP | 2006-287843 | 10/2006 |

OTHER PUBLICATIONS

International Search Report for PCT/JP2006/326190, mailed Mar. 20, 2007.
"Japanese Office Action" mailed by JPO and corresponding to Japanese application No. 2012-085953 on Jun. 26, 2012, with English translation.

* cited by examiner

```
login: default
Change the panel mode switch to "B" and press return...
:
Change the panel mode switch to "A" and press return...
```

FIG.16

METHOD FOR LOGGING IN TO COMPUTER, INFORMATION PROCESSING APPARATUS AND COMPUTER-READABLE INFORMATION RECORDING MEDIUM

CROSS-REFERENCE TO RELATED APPLICATIONS

This application is a U.S. continuation application filed under 35 USC 111(a) claiming benefit under 35 USC 120 and 365(c) of PCT application JP2006/326190, filed Dec. 28, 2006, the entire contents of which are incorporated herein by reference.

FIELD

The embodiment discussed herein is directed to a method for logging in to a computer, information processing apparatus and a computer-readable information recording medium.

BACKGROUND

A computer may include a main unit and a removable unit which is removable from the main unit. When a user code is transmitted to the main unit from the removable unit, the main unit compares the contents of the user code with the contents of a unit code which is recorded in the main unit. When the contents of the user code agree with the contents of a unit code, the main unit allows a system to start up. When the contents of the user code do not agree with the contents of a unit code, the main unit does not allow the system to start up.
Patent Document: Japanese Laid-Open Patent Publication No. 2002-341957

SUMMARY

In the embodiment, a method for logging in to a computer includes carrying out a log-in display on a terminal unit when the terminal unit is connected to a system management apparatus; carrying out a display to urge an operator to carry out a physical operation using the operation panel when a long-in starting operation is carried out to the terminal unit in response to the log-in display; sending an operation detection signal when the detecting the physical operation to an operating panel; and controlling the computer to cause the computer to enter a logged-in state when detecting the operation detection signal.

The object and advantages of the invention will be realized and attained by means of the elements and combinations particularly pointed out in the claims.

It is to be understood that both the foregoing general description and the following detailed description are exemplary and explanatory only and are not restrictive of the invention, as claimed.

DESCRIPTION OF EMBODIMENTS

An information processing apparatus (referred to as a system management apparatus, hereinafter) is provided for managing an operation of a computer such as a server.

The system management apparatus is a computer which operates with a CPU which is different from a CPU of the server. Because the server has high security, it is preferable that an account which is used for initially using the server computer is managed securely.

The system management apparatus is connected to the server. The system management apparatus may be provided in the inside of the server, or connected to the server externally.

The system management apparatus is mounted to the server as a computer which operates with the CPU different from the CPU of the server as mentioned above. The system management apparatus has a function of carrying out various sorts of control operations for the server.

In order to carry out management of the server, an operator connects a terminal unit which is a computer to the system management apparatus, and logs in to the server with the use of an account which is previously set.

Then, the operator may start using the server by carrying out various settings such as creating a new account, after logging in to the server.

Figure 1:
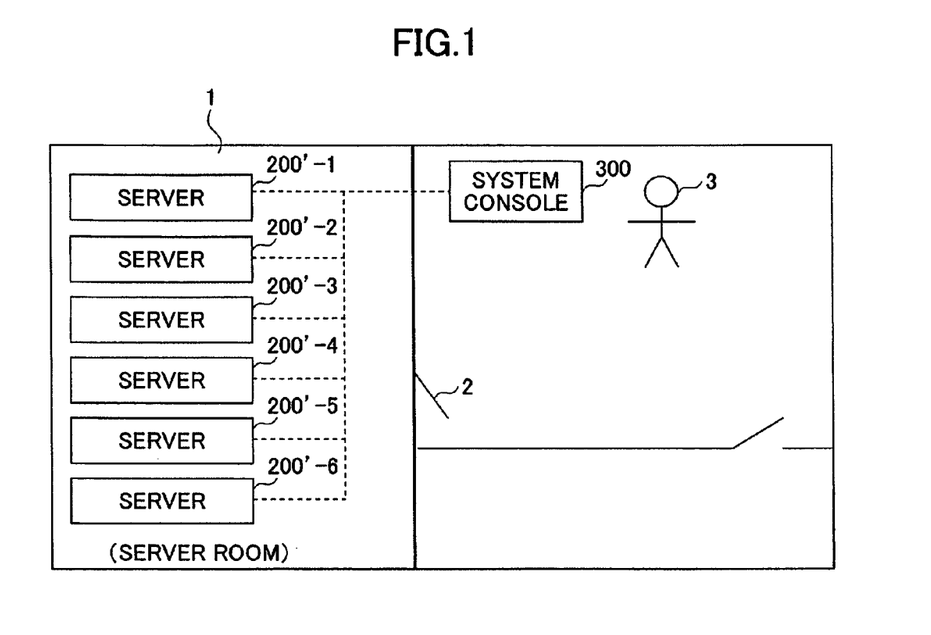
FIG. 1 illustrates relationship between a server room and servers.
Figure 2:
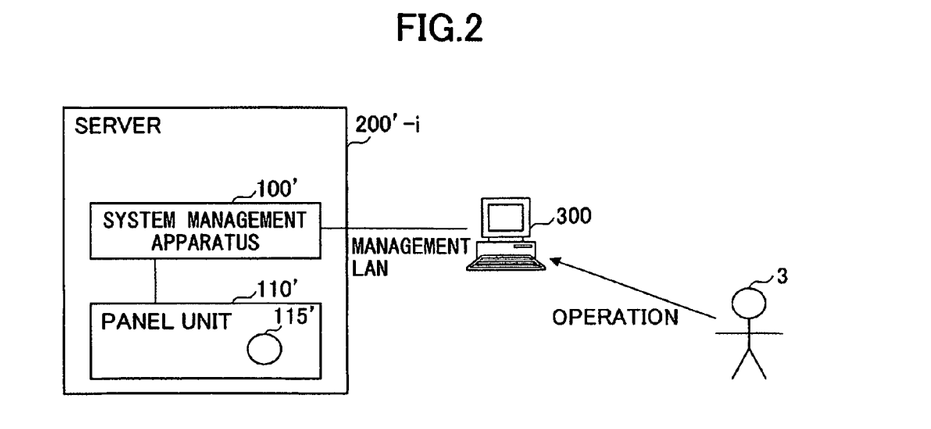
FIG. 2 depicts a block diagram for illustrating a configuration of a server depicted in FIG. 1.
Figure 3:
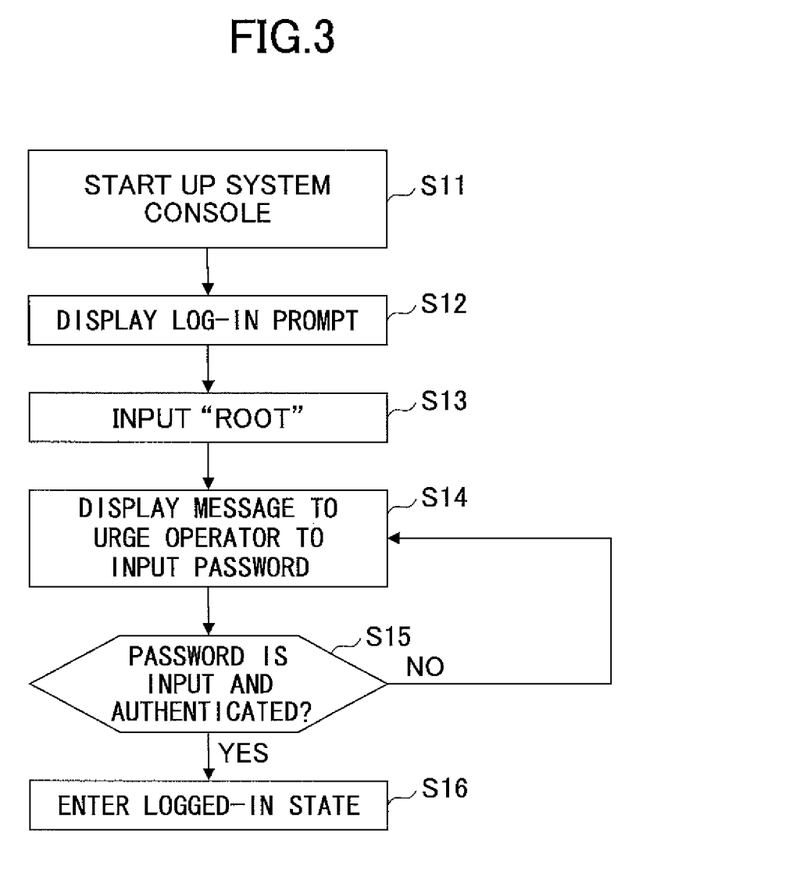
FIG. 3 depicts an operation flowchart for illustrating an operation to log in to a server depicted in FIG. 1.

FIG. 1 depicts an arrangement of a server room 1 and servers. FIG. 2 depicts a block diagram of a configuration of each server depicted in FIG. 1. FIG. 3 depicts an operation flowchart of an operation when an operator 3 logs in to a server depicted in FIG. 1.

As depicted in FIG. 1, the servers 200'-1, 200'-2, 200'-3, . . . (any one of which may be generally referred to as a "server 200'-i", hereinafter) are installed in the server room 1. Entering the service room 1 is strictly controlled by means of a security door 2.

An operator 3, for example a system manager who has a right to manage the server 200'-i, manages a server 200'-i with the use of a system console 300, which is also provided in the server room 1, and is a computer different from the server 200'-i.

As depicted in FIG. 2, the server 200'-i has a system management apparatus 100' provided therein, and a panel unit 110' which is provided in the system management apparatus 100'.

Further, a switch 115' is provided to the panel unit 110' for operating the system management apparatus 100'.

Hereinafter, the servers, the system management apparatus and the panel unit may be generally referred to as a server apparatus.

As depicted in FIG. 3, for the purpose of logging in to the server 200'-i, the system manager starts up the system console 300 (step S11).

As a result, a log-in prompt is displayed on a screen of the system console 300 (step S12).

Then, the system manager keys in, from a keyboard of the system console 300, a predetermined word, for example, "root" (step S13). In response thereto, an instruction to urge the operator 3 to key in a log-in password is displayed on the screen of the system console 300 (step S14).

In response thereto, the system manager keys in the log-in password. Then, when the log-in password agrees with a log-in password of a registered account (Yes in step S15), the server 200'-i enters a logged-in state (step S16).

In the example described above, when the system manager first uses the server 200'-i, the system manager uses the default account having the fixed log-in password set in the system management apparatus 100'. As the log-in password, a specific character string, for example, a serial number of the server apparatus, may be used. The account having the fixed log-in password is previously set in the system management apparatus 100'. Because the log-in password is thus fixed, it may be difficult to sufficiently improve security, although the fixed log-in password may have a complicate configuration.

That is, in the above-mentioned example in which the default account having the fixed log-in password is previously set, in a case where the server 200'-i is connected externally via a communication network for example, the server 200'-i may be accessed externally with the use of the fixed log-in password via the communication network, by an unauthorized person who illegally has obtained the password. Thus, it may be difficult to ensure a sufficiently high security.

It may be possible to change the log-in password for a case where the log-in password may leak. However, in many cases, changing the log-in password may not necessarily be easy.

An embodiment provides a method for logging in to a computer, an information processing apparatus and a computer-readable information recording medium, with which, it is possible to efficiently improve security with a relatively simple configuration.

According to the embodiment, when an operator connects a terminal unit to a system management apparatus for carrying out a setting for an operation of a computer with the use of the system management apparatus, a log-in control part of the system management apparatus carries out a log-in display on the terminal unit. Then, when the operator responds to the log-in display to carry out a log-in starting operation to the terminal unit, the log-in control part responds to the log-in starting operation, and displays an instruction to urge the operator to carry out a physical operation. Then, when the operator responds to the instruction to urge the operator to carry out the physical operation, and actually carries out the physical operation to a panel unit of the system management apparatus, a panel operation monitoring part of the system management apparatus detects the physical operation, and sends an operation detection signal. When receiving the operation detection signal, the log-in control part of the system management apparatus controls the computer to enter a logged-in state.

In the embodiment, the operator can cause the computer to enter the logged-in state by carrying out the physical operation to the panel unit according to the instruction displayed on the terminal unit which is connected to the system control apparatus.

Accordingly, in the embodiment, no log-in password is required for logging in to the computer, it is thus not necessary to previously set the log-in password, and thus, it is not necessary to take a countermeasure against a possibility that the log-in password may leak.

Further, a computer may be managed in such a state with improved security. That is, for example, such a computer is installed in a room for which entering the room is strictly controlled. Therefore, accessing a system management apparatus provided to the computer is also strictly controlled accordingly. As a result, an unauthorized person is prevented from illegally operating a panel unit of the system management apparatus. Thus, it is possible to prevent the computer from illegally entering a logged-in state.

Thus, in the embodiment, it is possible to provide a configuration such that a password otherwise required for logging in to a computer is omitted, and security is improved.

Next, with reference to figures, an embodiment will be described with reference to figures.

In the embodiment, an account having no password is provided in the server apparatus instead of providing an account having a password in a server apparatus, and, a hardware operation (or a physical operation) is applied for logging in to the server apparatus with the use of the account.

For example, a switch is provided to the server apparatus for logging in to the server apparatus, and an operation of the switch is applied.

Thus, the physical operation is to be carried out to the server apparatus, to which logging in is to be achieved. Thereby, it is possible to avoid access the server apparatus via a communication network, and it is possible to solve a problem of password leakage.

That is, in the embodiment, as an account for logging in to the server apparatus for the purpose of using the server apparatus, an account having no password is provided in the server apparatus instead of providing an account having a password in the server apparatus. Also, in the embodiment, a hardware operation (or a physical operation) to be carried out to the server apparatus is applied for logging in to the server apparatus with the use of the account.

Figure 4:
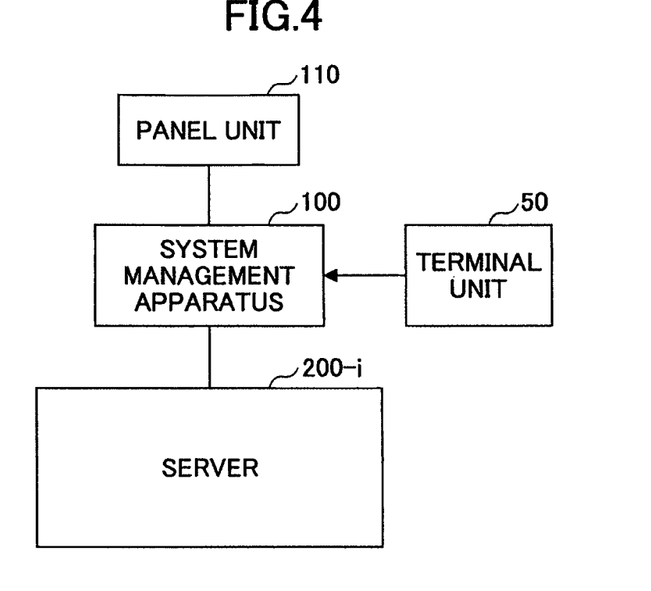
FIG. 4 depicts a block diagram for illustrating a configuration of a computer system in an embodiment.
Figure 5:
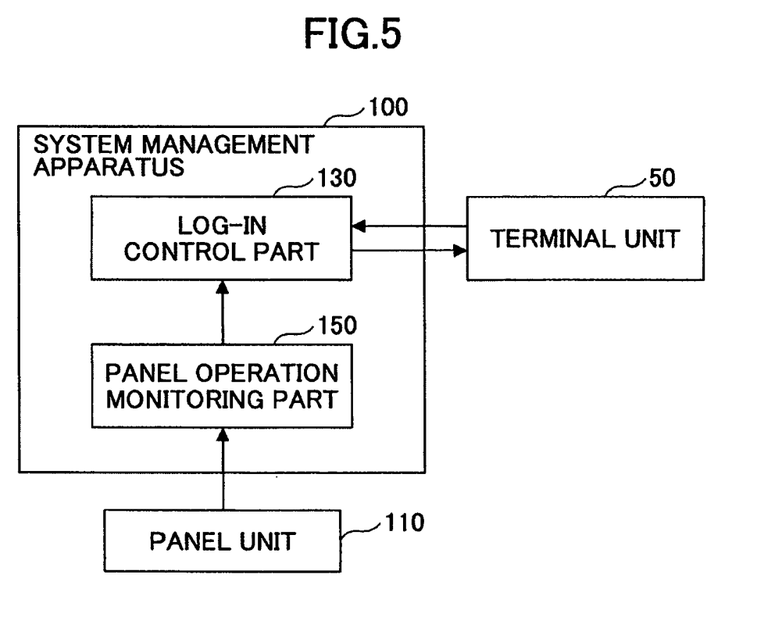
FIG. 5 depicts a configuration of a system management apparatus in the computer system depicted in FIG. 4.
Figure 6:
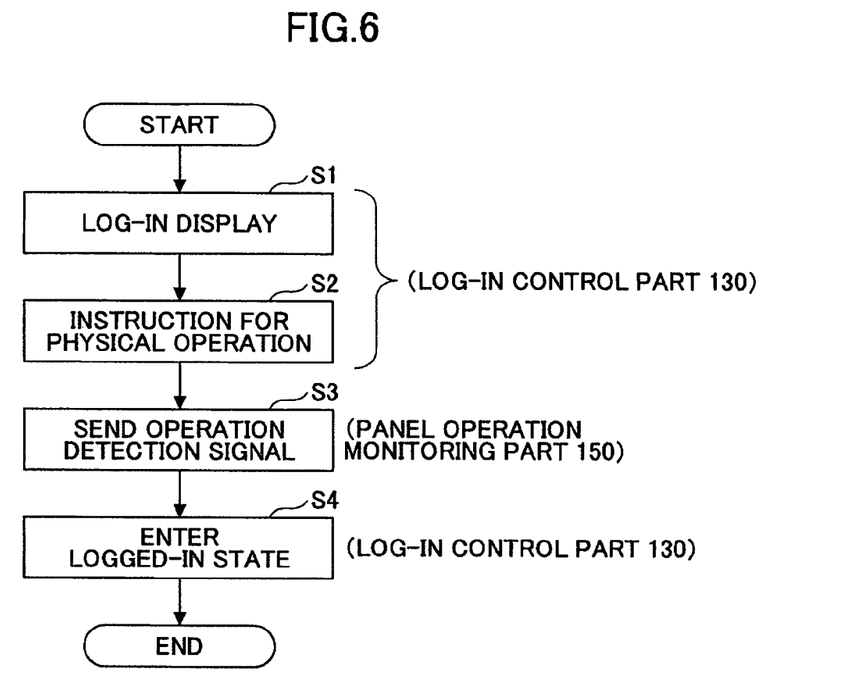
FIG. 6 depicts an operation flowchart for illustrating an operation of the system management apparatus in the computer system in the embodiment.

FIG. 4 depicts a block diagram of a configuration of a computer system in an embodiment. FIG. 5 depicts a block diagram of a configuration of a system management apparatus included in the computer system. FIG. 6 depicts an operation flowchart for an operation of the system management apparatus.

As depicted in FIG. 4, in the computer system in the embodiment, a server 200-i is provided with the system management apparatus 100 which controls an operation of the server 200-i, and a panel unit (which may also be referred to as an operating panel) 110 is provided to the system management apparatus 100.

The system management apparatus 100 is a computer which operates with a CPU different from a CPU of the server 200-i.

An operator 3 who acts as a system manager connects a terminal unit 50 which may be a personal computer or such to the system management apparatus 100, operates the system management apparatus 100 with the use of the terminal unit 50, and carries out necessary setting operations to the server 200-i.

As depicted in FIG. 5, the system management apparatus 100 has a log-in control part 130 and a panel operation monitoring part 150.

As will be described later, the log-in control part 130 and the panel operation monitoring part 150 are provided in the system management apparatus 100 in a form of firmware, and are realized as a result of the CPU of the computer of the system management apparatus 100 executing the firmware.

An operation of the system management apparatus 100 when the operator 3 acting as the system manager logs in to the server 200-i will be described with reference to FIG. 6.

In order to carry out a setting operation for an operation of the server 200-i via the system management apparatus 100, the operator 3 connects the terminal unit 50 to the system management apparatus 100. In response thereto, the log-in control part 130 of the system management apparatus 100 carries out a log-in display on a screen of the terminal unit 50 (step S1).

When the operator 3 responds to the log-in display to carry out a log-in starting operation from a keyboard of the terminal unit 50, the log-in control part 130 responds thereto, and displays an instruction to urge the operator 3 to carry out a physical operation (step S2).

When the operator 3 actually carries out the physical operation to the panel unit 110 in response to the instruction to urge the operator 3 to carry out the physical operation, the panel operation monitoring part 150 of the system management apparatus 100 detects the physical operation, and sends an operation detection signal (step S3).

When the log-in control part 130 of the system management apparatus 100 receives the operation detection signal, the log-in control part 130 controls the computer of the server 200-i to cause the computer to enter a logged-in state (step S4).

Figure 7:
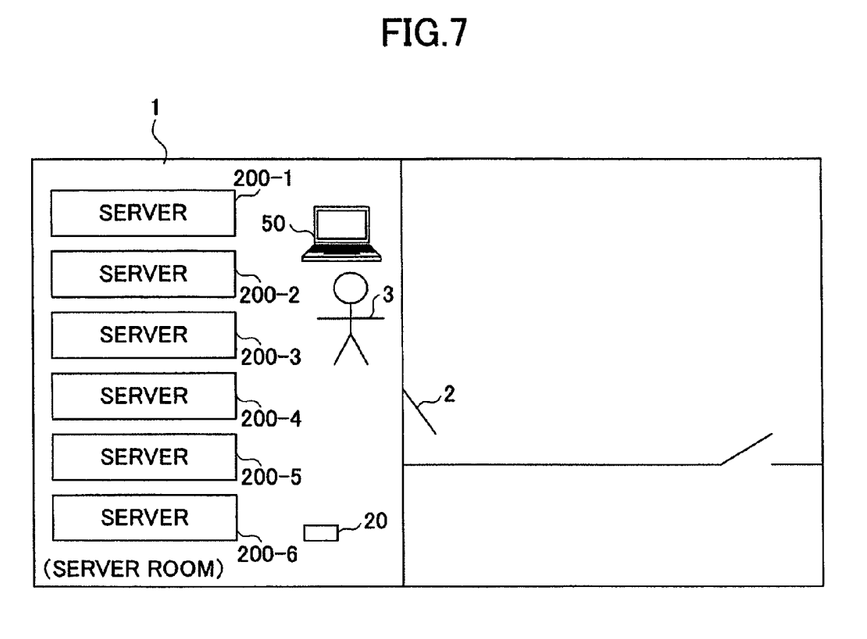
FIG. 7 illustrates relationship between a server room and servers in the computer system in the embodiment.

FIG. 7 illustrates positional relationship between a server room 1 and the server 200-i.

As depicted in FIG. 7, a plurality of servers 200-1, 200-2, 200-3, . . . , any one of which may be generally referred to as the server 200-i, are installed in the server room 1. A security door is provided to the server room, and entering the server room 1 is strictly controlled by the strictly door 2.

An operator 3 who acts as a system manager having a right to manage the server 200-i enters the server room 1, and connects the terminal unit 50 to the system management apparatus 100 which is provided to the server 200-i. Then, the operator 3 uses a key 20 which is provided in the server room 1, carries out a physical operation to the server 200-i, logs in to the server 200-i, and then, carries out necessary setting operations to the server 200-i.

Figure 8:
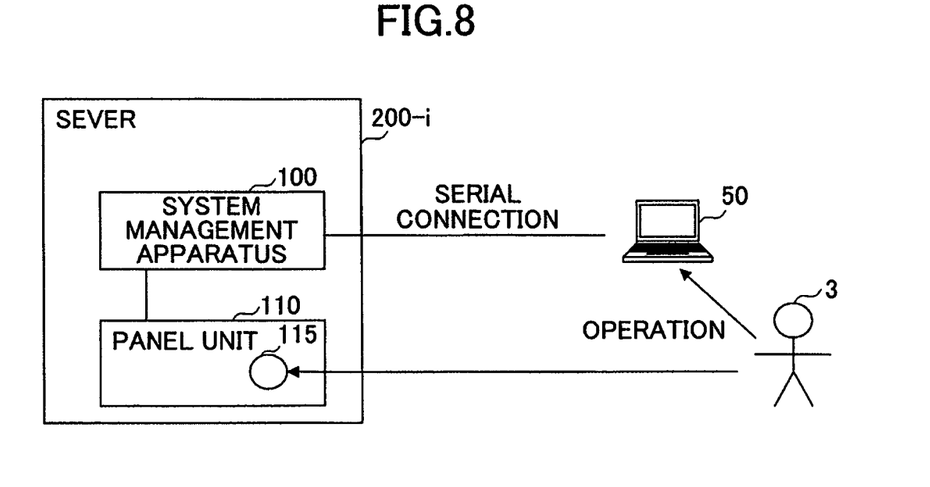
FIG. 8 depicts a block diagram for illustrating a configuration of a server in the computer system in the embodiment.
Figure 9:
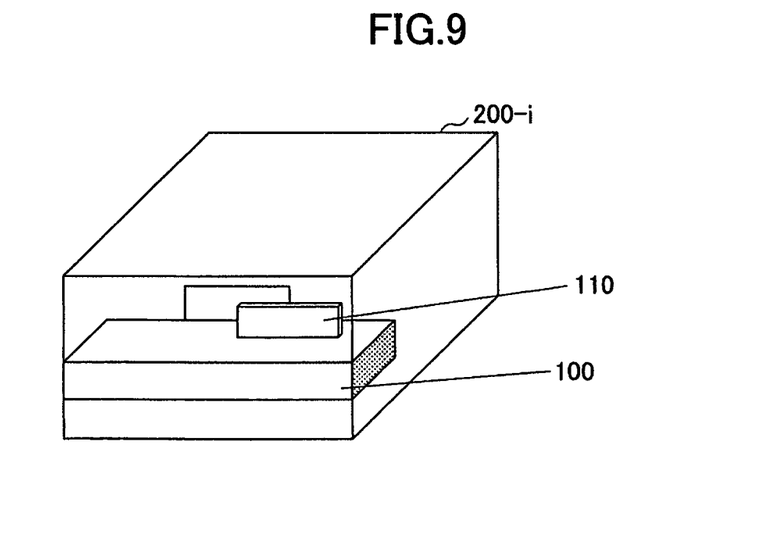
FIG. 9 depicts a perspective view of one example of an external appearance of a server in the computer system in the embodiment.

FIG. 8 depicts a block diagram of a configuration of the server 200-i described with reference to FIG. 7. FIG. 9 depicts a perspective view of one example of an external appearance of the server 200-i.

Figure 10:
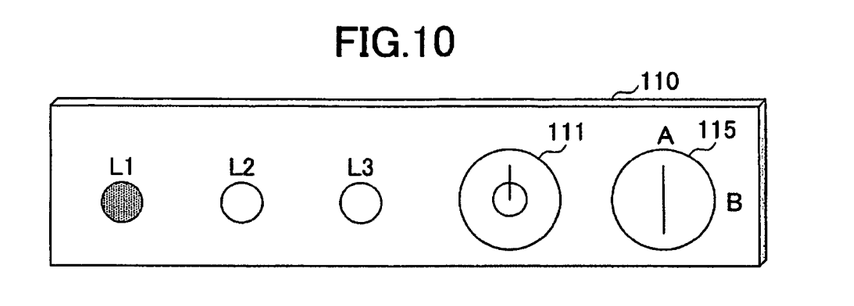
FIG. 10 depicts a front view of a panel unit of the system management apparatus in the computer system in the embodiment.
Figure 11A:
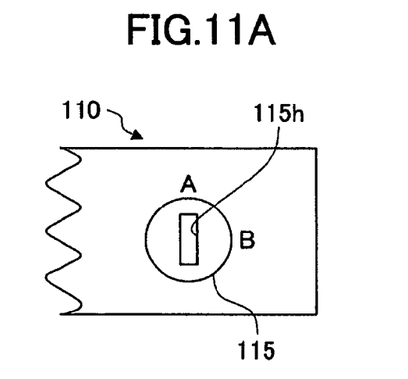
FIGS. 11A and 11B depict front views for illustrating a switch provided to the panel unit of the system management apparatus in the computer system in the embodiment.
Figure 11B:
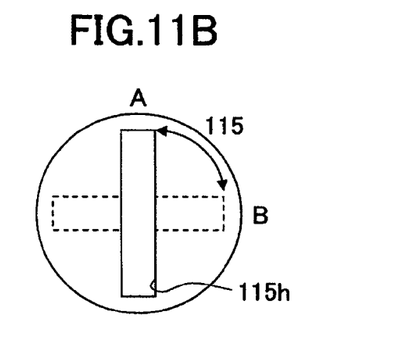

FIG. 10 depicts a front view of one example of the panel unit 110 provided to the system management apparatus 100. FIGS. 11A and 11B depict front views illustrating a switch 115 provided on the panel unit 110 of the system management apparatus 100.

FIG. 11A depicts a part of the panel unit 110 including the switch 115 and the periphery thereof. FIG. 11B depicts the switch 115 in a magnified manner.

Figure 12A:
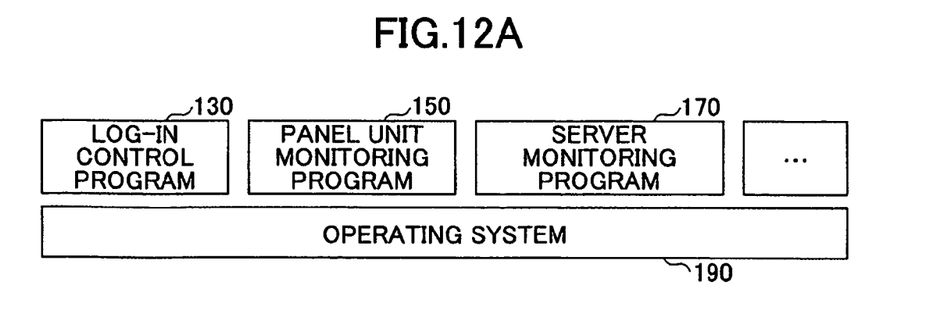
FIG. 12A depicts a block diagram for illustrating a configuration of firmware which the system management apparatus in the computer system in the embodiment has.
Figure 12B:
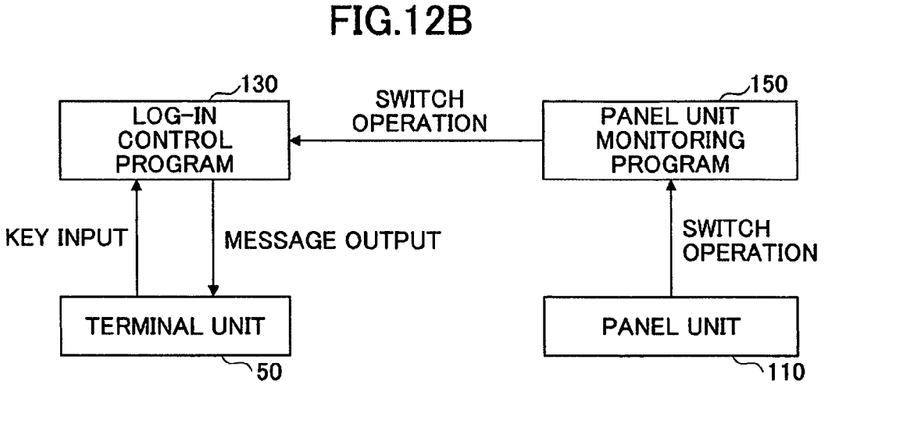
FIG. 12B depicts a block diagram for illustrating a function of the firmware depicted in FIG. 12A.

FIG. 12A depicts a block diagram of a configuration of the firmware provided in the system management apparatus 100 as mentioned above. FIG. 12B depicts a block diagram illustrating a function of the firmware depicted in FIG. 12A.

As mentioned above, the server 200-i is provided with the system management apparatus 100 and the panel unit 110.

In the embodiment, as depicted in FIGS. 8 and 9, the system management apparatus 100 is provided in the inside of the server 200-i. However, the system management apparatus 100 may not be provided in the inside of the server 200-i but may be connected to the server 200-i externally.

As mentioned above, the system management apparatus 100 is the computer which operates with the CPU different from the CPU of the server 200-i, and carries out various control operations for the server 200-i.

As depicted in FIG. 12A, in the system management apparatus 100, the log-in control part and the panel operation monitoring part are mounted in a form of the firmware, as a log-in control program 130 and a panel unit monitoring program 150, respectively. Further, for the purpose of monitoring an operation of the server 200-i, a server monitoring program 170 is mounted. These application programs 130, 150 and 170 operate on an operating system 190 in the system management apparatus 100.

Further, as depicted in FIG. 12B, the log-in control program 130 receives from the terminal unit 50 an operating signal generated according to an operation carried out by the operator 3 to the terminal unit 50, sends a signal for a message to be displayed on the terminal unit 50, and receives from the panel unit monitoring program 170 an operating signal generated according to an operation carried out by the operator 3 to the switch 115 of the panel unit 110.

As depicted in FIG. 10, the panel unit 110 has indicator lights L1, L2 and L2 which are LEDs (Light-Emitting Diode) and respectively indicate states of the server 200-i. The panel unit 110 further has a power button 111 and the switch 115 to be operated by an operator 3.

By operating the power button 111, it is possible to turn on and off of the system management apparatus 100. It is noted that an operation carried out by the panel unit 110 is under the control of the system management apparatus 100.

As depicted in FIGS. 11A and 11B, the switch 115 has a key inserting hole 115h. An operator 3 inserts the key 20 in the key inserting hole 115h, and then, can turn the switch 115. By turning the switch 115, it is possible to change a state of the switch 115 between two states, an "A" state (vertical state) and a "B" state (horizontal state).

The terminal unit 50 is a computer for an operator 3 used to access the system management apparatus 100, and is connected with the system management apparatus 100 in a serial connecting manner.

Figure 13:
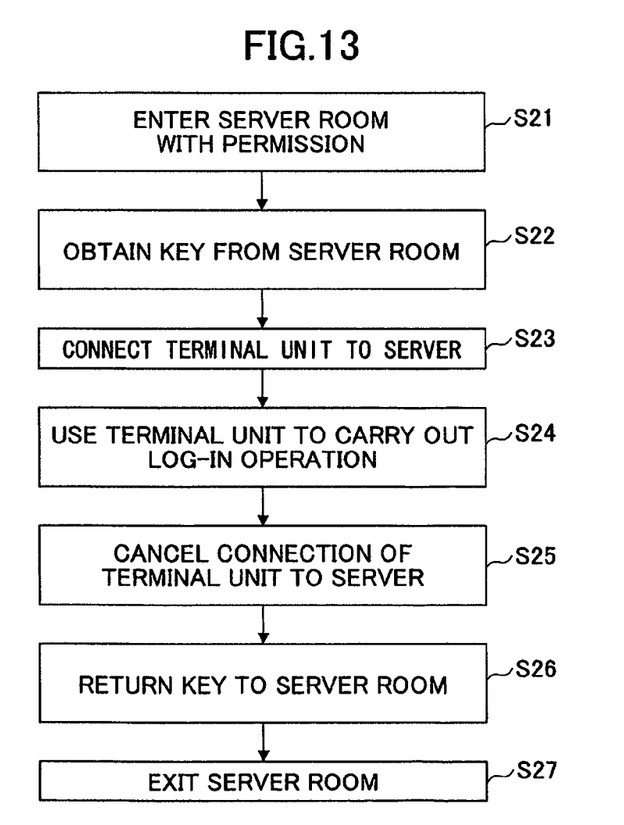
FIGS. 13 and 14 depict operation flowcharts for illustrating an operation to log in to a server in the computer system in the embodiment.
Figure 14:
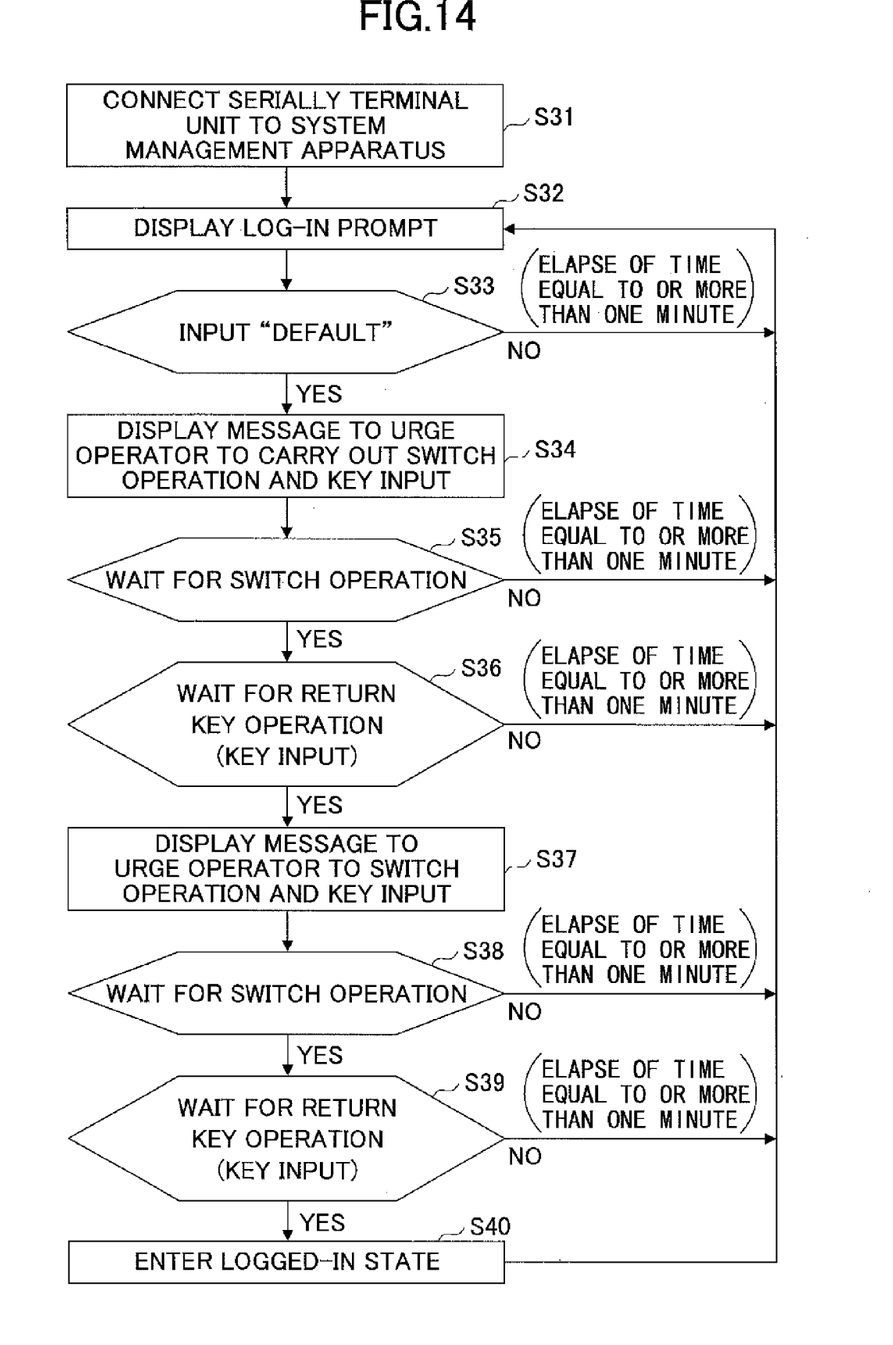
Figure 15:
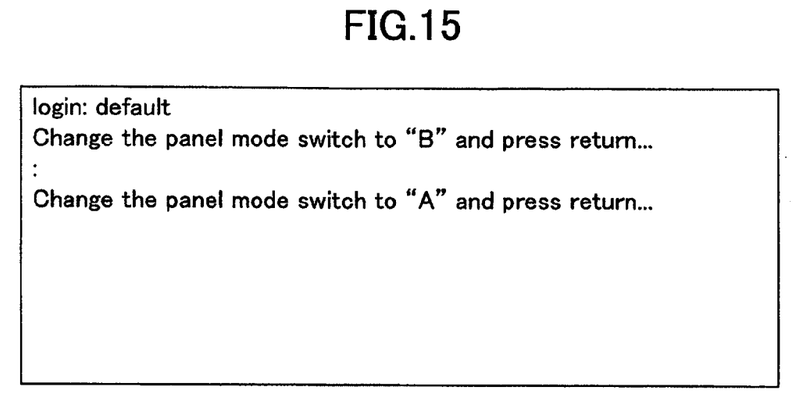
FIG. 15 depicts an example of messages displayed on a screen of a terminal unit.

FIG. 13 and FIG. 14 depict a flowchart for a log-in operation to log in to the server 200-i in the embodiment. FIG. 15 depicts an example of a display carried out on a screen of the terminal unit 50.

In FIG. 13, the operator 3 enters the server room 1 after removing security control on the server room 1, for example, by obtaining permission of a manager of the server room 1 to enter the security room 1 (step S21). Then, the operator 3 obtains the key 20 provided in the server room 1, as depicted in FIG. 7 (step S22).

The operator 3 then connects the own terminal unit 50 to the system management apparatus 100 provided in the server 200-i (step S23), and uses the key 20 to operates the switch 115 of the panel unit 110 of the system management apparatus 100 to cause the server 200-i to enter a logged-in state (step S24). Details of the operation to cause the server 200-i to enter the logged-in state will be described later with reference to FIG. 14.

In FIG. 13, after the operator 3 causes the server 200-i to enter the logged-in state in step S24, the operator 3 carries out necessary setting operations to the server 200-i through the terminal unit 50 and the system management apparatus 100. After that, the operator 3 carries out an operation to the terminal unit 50 to cancel the connection between the terminal unit 50 and the server 200-i through the system management apparatus 100 (step S25).

After that, the operator 3 returns the key 20 to the server room 1 (step S26), and exits the server room 1 (step S27).

Next, with reference to FIG. 14, the details of the operation to cause the server 200-i to enter the logged-in state will be described.

When the operator 3 connects the terminal unit 50 to the system management apparatus 100 by a serial cable (not depicted) (step S31), a log-in prompt "login: default" is displayed on the screen of the terminal unit 50 as depicted, on first line, in FIG. 15 (step S32).

This operation of step S32 is carried out by the log-in control part 130 (the log-in control program 130 depicted in FIG. 12A) of the system management apparatus 100, and corresponds to step S1 of FIG. 6.

In response, the operator 3 carries out an operation to log in to the server 200-i with the use of a default account (step S33).

That is, the operator 3 keys in a predetermined word, for example, "default", and presses a return key on a keyboard of the terminal unit 50.

When the operator 3 keys in "default", and presses the return key (Yes in step S33), the log-in control program 130 responds thereto, and displays a message to urge the operator 3 to carry out "switch operation and key input", i.e., "Change the panel mode switch to "B" and press return" as depicted in FIG. 15, second line, on the screen of the terminal unit 50 (step S34). This operation of step S34 corresponds to step S2 of FIG. 6.

The message of step S34 "Change the panel mode switch to "B" and press return" is used to urge the operator 3 to carry out an operation to turn the switch 115 to the "B" state, for a case where the switch 115 has been in the "A" state, and then, press the return key. On the other hand, for a case where the switch 115 has been in the "B" state, a message to urge the operator 3 to carry out an operation to turn the switch 115 to the "A" state, and then, press the return key is displayed.

It is noted that, when the word "default" has not been keyed in within one minute in step S33, that is, a timeout event occurs (No in step S33), the log-in control program 130 returns to step S32, and starts from carrying out step S32 to again display the log-in prompt.

The operator 3, who sees the message urging to operate the switch 115 to the "B" state or to the "A" state displayed in step S34, responds to the message to insert the key 20 to the switch 115 on the panel unit 110 of the system management apparatus 100 and turns the switch 115 to the "B" state or to the "A" state accordingly. Then the operator 3 presses the return key on the keyboard of the terminal unit 50.

As a result of the operator 3 operating the switch 115 (Yes in step S35), the operation is detected by the panel operation monitoring part 150 (the panel unit monitoring program 150 depicted in FIG. 12A) of the system management apparatus 100, which then transmits a signal indicating the detection to the log-in control program 130. This operation corresponds to step S3 of FIG. 6.

Then, when the operator 3 presses the return key on the terminal unit 50 (Yes in step S36), the log-in control program responds thereto, and displays a message, such as "Change the panel mode switch to "A" and press return" as depicted in FIG. 15, last line, on the screen of terminal unit 50, to urge the operator 3 to carry out a switch operation and a key input (step S37). This operation corresponds to step S2 of FIG. 6.

The message of step S37 "Change the panel mode switch to "A" and press return" is to urge the operator 3 to carry out an operation to turn to return the switch 115 to the "A" state, for the case where the switch 115 has been once turned to the "B" state from the "A" state, and then, press the return key. On the other hand, for the case where the switch 115 has been once turned to the "A" state from the "B" state, a message to urge the operator 3 to carry out an operation to turn the switch 115 to return to the "B" state, and then, press the return key is displayed.

It is noted that, when the operation to turn the switch 115 to the "B" state or to the "A" state has not been carried out within one minute in step S35, that is, a timeout event occurs (No in step S35), the log-in control program 130 returns to step S32, and starts from carrying out step S32 to again display the log-in prompt. Further, when the return key has not been pressed within one minute after the operation to turn the switch 115 to the "B" state or to the "A" state has been carried out, that is, a timeout event occurs (No in step S36), the log-in control program 130 returns to step S32, and starts from carrying out step S32 to again display the log-in prompt.

The operator 3 sees the message of step S37 to operate the switch 115 and press the key, and then, inserts the key 20 to the switch 115 on the panel unit 110 of the system management apparatus 100 and turns to return the switch 115 to the "A" state or to the "B" state, and presses the return key of the keyboard of the terminal unit 50.

As a result of the operator 3 carrying out the operation of the switch 115 (Yes in step S38), the switch operation is detected by the panel unit monitoring program 150, which then transmits a signal indicating the detection to the log-in control program 130. This operation corresponds to step S3 of FIG. 6.

Then, as a result of the operator 3 carrying out the operation of pressing the return key (Yes in step S39), the log-in control program 130 causes the server 200-i to enter a logged-in state (step S40). This operation corresponds to step S4 of FIG. 6.

It is noted that, when the operation to turn the switch 115 to return to the "A" state or to the "B" state has not been carried out within one minute, that is, a timeout event occurs (No in step S38), the log-in control program 130 returns to step S32, and starts from carrying out step S32 to again display the log-in prompt. Further, when the return key has not bee pressed within one minute after the operation to turn the switch 115 to the "A" state or to the "B" state has been carried out, that is, a timeout event occurs (No in step S39), the log-in control program 130 returns to step S32, and starts from carrying out step S32 to again display the log-in prompt.

The above-mentioned log-in operation of the default account, which includes the operator's operations of keying in "default", once turning the switch 115, pressing the return key, again turning the switch 115 to return to the original state and then pressing the return key, causes the server 200-i to enter the logged-in state (step S40). After that, the operator 3 can carry out various settings which are required to actually start using the server 200-i, such as creating a new account, a setting of a communication network for the server 200-i and distribution of resources such as memories, through operation of the terminal unit 50.

Thus, in the computer system in the embodiment, the default account which has no password is provided as an account for logging in to the server 200-i, and a configuration is provided such that, a direct and physical operation to the system management apparatus 100, which is provided to the server 200-i itself, is required as a condition for logging in to the server 200-i. As a result, the operator 3 does not need to previously set and manage a password, and also, the authorized person can positively log in to the server 200-i while it is possible to sufficiently improve security against illegal access by an unauthorized person.

It is noted that the above-mentioned direct and physical operation means an operation directly carried out by an operator himself or herself (in the embodiment described above, operations to turn the switch 115 between the "A" and "B" states). Thus, an indirect operation such as an operation via a communication network, an operation with the use of an electric signal and so forth, are not considered as a direct and physical operation. In the embodiment described above, as mentioned above with reference to FIGS. 8 and 9, the panel unit 110 is provided to the system management apparatus 100, and the panel unit 110 may be considered as a part of the system management apparatus 100. Accordingly, an operation of the switch 115 of the panel unit 110 may be considered as a direct and physical operation carried out to the system management apparatus 100.

Thus, in the computer system in the embodiment, it is not necessary to prepare an account having a password in the server 200-i, it is possible to avoid access to the server 200-i via a communication network, and it is possible to improve security of the server 200-i.

Further, since no password is used, it is possible to avoid leakage of a password, and thus, it is possible to improve security.

Further, in the embodiment, a direct and physical operation is required for logging in to the server 200-i as mentioned above. Therefore, it is possible to easily limit a person who can actually carry out a direct and physical operation to the system management apparatus 100. That is, the server 200-i together with the system management apparatus 100 is installed in the server room 1 which is secured and thus avoids entering of any unauthorized person. Therefore, the method of requiring a direct and physical operation for logging in to the server 200-i is advantageous in terms of security.

In the example of FIGS. 1 to 3, when the server is repaired or maintained, a necessary account is created by a user of the server and the account is used by a maintenance person. In contrast thereto, in the computer system in the embodiment, the default account is used as mentioned above. Accordingly, a user of the server 200-i does not need to create a special account for logging in to the server 200-i.

Especially, recently a system using servers may be introduced as an infrastructure of an enterprise or a society, and thus, improvement of security of the system is demanded. In the circumstances, avoidance of such a work to create a special account may be required.

In the computer system in the embodiment, the default account as mentioned above is used. Accordingly, it is possible that a maintenance person can positively log in to the server 200-i, and carry out necessary maintenance of the server 200-I, without degradation of security of the server 200-i.

As described above, by applying the default account in the computer system in the embodiment, it is possible to physically limit a person who can actually operate the system management apparatus 100 to log in to the server 200-i. Therefore, the default account is advantageous to be used as an account for maintenance.

Figure 16:
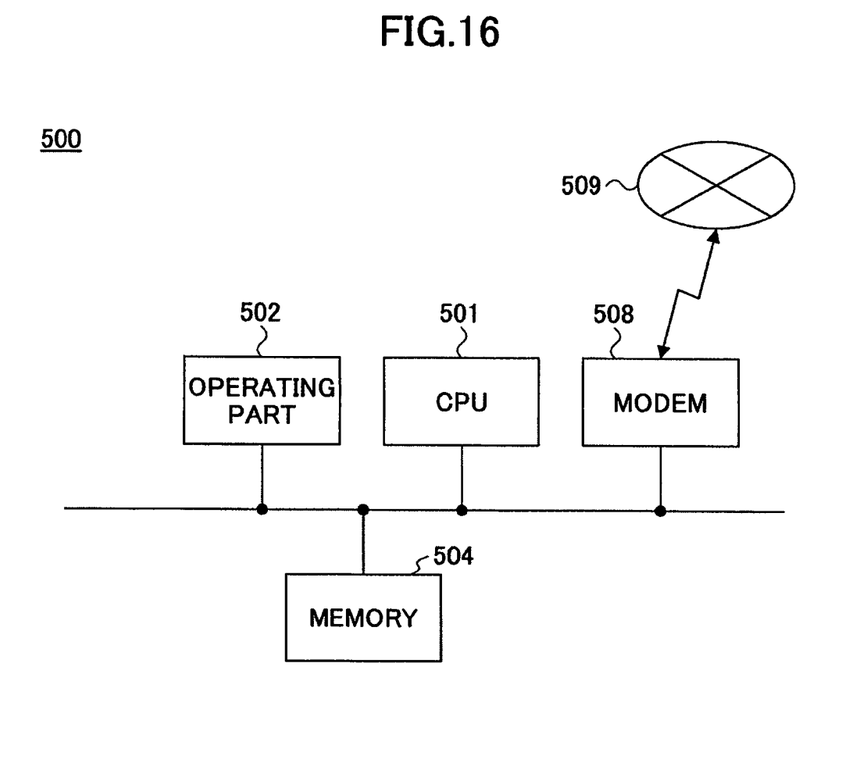
FIG. 16 depicts a block diagram of a computer which may be applied as the system management apparatus in the computer system in the embodiment.

FIG. 16 depicts a block diagram of an example of a hardware configuration of a computer acting as the system management apparatus 100 in the computer system in the embodiment.

As depicted in FIG. 16, a computer 500 (the system management apparatus 100) includes a CPU 501 which performs various operations by executing programs, an operating part 502 (the panel unit 110), a memory 504 storing the programs to be executed by the CPU 501 and various data, and which may be used as a work area of the CPU 501, and a modem 508 used for downloading programs or data from an external server via a communication network 509 such as the Internet, a LAN or such. The memory 504 includes a volatile memory (a RAM or such, not depicted) and a non-volatile memory (not depicted).

In the computer 500, before the computer is shipped, the log-in control program 130, the panel unit monitoring program 150, the server monitoring program 170 and so forth are stored in the non-volatile memory of the memory 504 as the firmware.

These programs are loaded on the volatile memory of the memory 504 and are executed by the CPU 501 as is necessary. Thus, the computer 500 acts as the system management apparatus 100.

Further, the log-in control program 130, the panel unit monitoring program 150, the server monitoring program 170 and so forth may be replaced or upgraded as a result of, with the use of the modem 508, corresponding programs being downloaded via the communication network 509.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. An information processing apparatus having a function to control an operation of a main unit, and having an operating panel, comprising:
   a setting operation receiving part configured to receive a setting operation for an operation of the main unit via a terminal unit;
   a log-in control part configured to carry out a log-in display on the terminal unit, carry out a display of a message to urge an operator to carry out a physical operation using the operating panel in response to a log-in starting operation carried out to the terminal unit in response to the log-in display, and respond to an operation detection signal to control the main unit to cause the main unit to enter a logged-in state; and
   a panel operation monitoring part configured to detect the physical operation carried out to the operating panel in response to the display to urge to carry out the physical operation, and send the operation detection signal;
   wherein the log-in control part is configured to display the message to urge to carry out the physical operation when an account is input to the setting operation receiving part via the terminal unit,
   wherein the physical operation includes inserting a key into a switch provided on the operating panel and changing an orientation of the switch by turning the key, when the key in inserted, the key has a first state in which the key is in a first orientation or a second state in which the key is in a second orientation, when the key is in the first state, the message to urge to carry out the physical operation is a message urging that the key be changed from the first state to the second state, when the key is in the second state, the message to urge to carry out the physical operation is a message urging that the key be changed from the second state to the first state, wherein a condition for logging in to the main unit is a combination of inputting the account and carrying out the physical operation that is urged by the inputting of the account, wherein the logging in to the main unit is allowed when the account is input and the physical operation is carried out before a timeout event occurs, the timeout event occurs when either the account is not entered within a predetermined amount of time from the log-in starting operation or the physical operation is not carried out within a predetermined amount of time from when the message to urge to carry out the physical operation is displayed.

2. The information processing apparatus as claimed in claim 1, wherein:

when the panel operation monitoring part detects that the physical operation has not been carried out to the operating panel within the predetermined amount of time from when the message to urge to carry out the physical operation is displayed, the log-in control part again carries out the log-in display.

3. A non-transitory computer-readable information recording medium storing a program which, when executed by a computer processor of a system management apparatus, performs a method for logging in to a main unit, the method comprising:

carrying out a log-in display on a terminal unit when the terminal unit is connected to the system management apparatus;

carrying out a display to urge an operator to carry out a physical operation using an operating panel connected to the system management apparatus when a log-in starting operation is carried out to the terminal unit in response to the log-in display;

generating an operation detection signal when detecting the physical operation carried out to the operating panel; and controlling the main unit to cause the main unit to enter a logged-in state when detecting the operation detection signal;

wherein the display to urge the operator to carry out the physical operation is carried out when an account is input to the system management apparatus via the terminal unit;

wherein the physical operation includes inserting a key into a switch provided on the operating panel and changing an orientation of the switch by turning the key, when the key in inserted, the key has a first state in which the key is in a first orientation or a second state in which the key is in a second orientation, when the key is in the first state, the message to urge to carry out the physical operation is a message urging that the key be changed from the first state to the second state, when the key is in the second state, the message to urge to carry out the physical operation is a message urging that the key be changed from the second state to the first state, wherein a condition for logging in to the main unit is a combination of inputting the account and carrying out the physical operation that is urged by the inputting of the account, wherein the logging in to the main unit is allowed when the account is input and the physical operation is carried out before a timeout event occurs, the timeout event occurs when either the account is not entered within a predetermined amount of time from the log-in starting operation or the physical operation is not carried out within a predetermined amount of time from when the message to urge to carry out the physical operation is displayed.

4. The non-transitory computer-readable information recording medium as claimed in claim 3, wherein:

the method comprises detecting that the physical operation has not been carried out to the operating panel within predetermined amount of time from when the message to urge to carry out the physical operation is displayed, and again carrying out the log-in display.

5. A method for logging in to a computer, comprising:

outputting an instruction to urge an operator to carry out a physical operation using an operating panel connected to the computer, when a log-in operation is carried out;

generating an operation detection signal when the physical operation is carried out in response to the instruction; and causing the computer to enter a logged-in state in response to generation of the operation detection signal;

wherein the instruction to urge the operator to carry out the physical operation is output when an account is input to the computer;

wherein the physical operation includes inserting a key into a switch provided on the operating panel and changing an orientation of the switch by turning the key, when the key in inserted, the key has a first state in which the key is in a first orientation or a second state in which the key is in a second orientation, when the key is in the first state, the message to urge to carry out the physical operation is a message urging that the key be changed from the first state to the second state, when the key is in the second state, the message to urge to carry out the physical operation is a message urging that the key be changed from the second state to the first state, wherein a condition for logging in to the computer is a combination of inputting the account and carrying out the physical operation that is urged by the inputting of the account, wherein the logging in to the computer is allowed when the account is input and the physical operation is carried out before a timeout event occurs, the timeout event occurs when either the account is not input within a predetermined amount of time from the log-in operation beginning or the physical operation is not carried out within a predetermined amount of time from when the message to urge to carry out the physical operation is displayed.

6. An information processing apparatus comprising:

an operation monitoring part configured to detect an operation conforming to a predetermined operation performed on an operation part and being changed and displayed in correspondence with a state of the operation part; and a log-in control part configured to control allowance of log-in to a computer in a case where the operation monitoring part detects the operation conforming to the predetermined operation;

wherein the predetermined operation includes a physical operation of using the operation part and being urged to be carried out by an operator using the operation part, wherein the physical operation includes inserting a key into a switch provided on the operation part and changing an orientation of the switch by turning the key, when the key in inserted, the key has a first state in which the key is in a first orientation or a second state in which the key is in a second orientation, when the key is in the first state, the message to urge to carry out the physical operation is a message urging that the key be changed from the first state to the second state, when the key is in the second state, the message to urge to carry out the physical operation is a message urging that the key be changed from the second state to the first state, wherein a condition for logging in to the computer is a combination of inputting an account and carrying out the physical operation that is urged by the inputting of the account, wherein the logging in to the computer is allowed when the account is input and the physical operation is carried out before a timeout event occurs, the timeout event occurs when either the account is not input within a predetermined amount of time from the log-in beginning or the physical operation is not carried out within a predetermined amount of time from when the message to urge to carry out the physical operation is displayed.

7. A method for logging in to a computer, comprising:

detecting, with an operation monitoring part, an operation conforming to a predetermined operation performed on an operation part and being changed and displayed in correspondence with a state of the operation part; and controlling, with a log-in control part, allowance of log-in to the computer in a case where the operation monitoring part detects the operation conforming to the predetermined operation;

wherein the predetermined operation includes a physical operation of using the operation part and being urged to be carried out by an operator using the operation part;

wherein the physical operation includes inserting a key into a switch provided on the operation panel and changing an orientation of the switch by turning the key, when the key in inserted, the key has a first state in which the key is in a first orientation or a second state in which the key is in a second orientation, when the key is in the first state, the message to urge to carry out the physical operation is a message urging that the key be changed from the first state to the second state, when the key is in the second state, the message to urge to carry out the physical operation is a message urging that the key be changed from the second state to the first state, wherein a condition for logging in to the computer is a combination of inputting an account and carrying out the physical operation that is urged by the inputting of the account, wherein the logging in to the computer is allowed when the account is input and the physical operation is carried out before a timeout event occurs, the timeout event occurs when either the account is not input within a predetermined amount of time from the log-in beginning or the physical operation is not carried out within a predetermined amount of time from when the message to urge to carry out the physical operation is displayed.

* * * * *